United States Patent Office 2,950,431
Patented Aug. 23, 1960

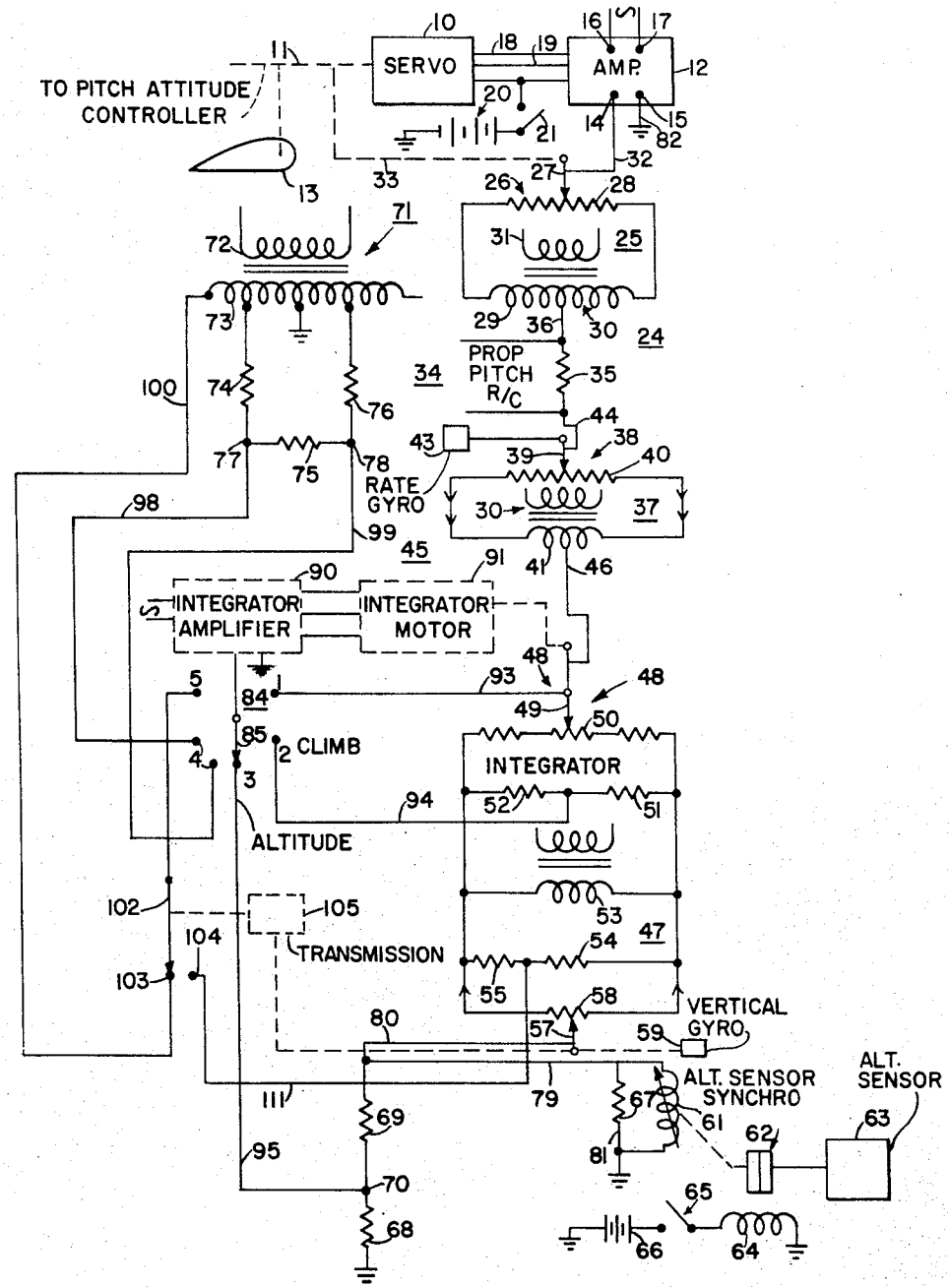

2,950,431

SERVOMOTOR CONTROL APPARATUS FOR DIRIGIBLE CRAFT

William T. Wright, Pacific Palisades, Calif., assignor to Minneapolis-Honeywell Regulator Company, Minneapolis, Minn., a corporation of Delaware Filed Oct. 28, 1957, Ser. No. 692,798

13 Claims. (Cl. 318—489)

The present invention relates to automatic control of a dirigible craft and more particularly to the provisions of maneuvering control of attitude or position of a craft.

One object of the present invention is to provide an improved apparatus for the maneuvering control of a dirigible craft, such as an aircraft.

Another object of the present invention is to provide novel control apparatus capable of controlling the rate of change of attitude of the craft until a predetermined attitude is attained and automatically upon such attainment stabilizing the craft on the attained attitude.

It is a further object of the present invention to provide a novel control apparatus for an aircraft wherein the control of craft attitude is shifted from reliance upon an attitude stabilizing reference device to reliance upon an altitude stabilizing device.

A further object is to provide a control apparatus for an aircraft to effect a constant rate of change of attitude of the craft about an axis and upon the attainment of a desired attitude to automatically stabilize the craft on this attitude and for cancelling steady state changes in attitude about the predetermined attitude.

Another object is to provide control apparatus for an aircraft for stabilizing the flight thereof at a predetermined attitude causing a rate of climb and thereafter shifting control of said apparatus to an altitude responsive device wherein non-transient altitude errors are eliminated.

A further object of the present invention is to provide a novel control apparatus for an aircraft for causing it to fly at a predetermined attitude thereafter shifting control of the apparatus to an altitude control and subsequently causing the attitude of the craft to alter at a predetermined rate until a desired attitude is attained at which time the attained attitude in maintained and non-transient departures from the attained attitude are eliminated.

Other objects and advantages of the present invention will become apparent from the description and accompanying drawings of a preferred embodiment in which the sole figure illustrates flight attitude maneuvering apparatus of the invention in electrical schematic form.

The invention has been applied to apparatus for controlling the craft about its lateral axis although control about its roll or yaw axes are also within the contemplation of the invention. The apparatus performs the functions of flight stabilization of the craft and flight path guidance of the craft in accordance with commands. Stabilization about the pitch axis is achieved by measuring the displacement and rate of displacement with the two signals, displacement and rate of displacement, from respective displacement and displacement rate sensors are supplied to amplifiers and servomotors causing deflections of control surfaces of the craft and the resultant reduction of the displacement signal to zero.

Flight path guidance is performed by units provided to control the aircraft about the pitch axis for various modes of flight. Radio command proportional pitch signals may be supplied from a suitable radio receiver.

The pitch angle of the craft can be changed directly from a motor operated integrator potentiometer, radio command proportional pitch, and an altitude controller. Other controls to be described are first transmitted through the integrator amplifier motor combination operating the integrator potentiometer.

A five position function selector is provided to select the particular control to be applied to the apparatus. Prior to initiation of a cycle of control involving climb, constant altitude, and dive of the aircraft, the selector is placed in the number one position wherein any displacement error signal is removed from the servo amplifier controlling the surface actuating servomotor.

In the number two position, a selected pitch-up attitude control of approximately nine degrees is applied to the integrator amplifier and the integrator motor integrates with respect to time the error between such nine degree pitch attitude called for and the attitude sensed by the pitch attitude gyroscope. The integrated error is fed into the pitch servo amplifier control circuit providing integral control on climb attitude. The integrator also simultaneously prevents sudden or step attitude changes upon initiation of such called for attitude.

When the selector is in the number three or constant altitude position the altitude controller senses changes from the altitude where first turned on. As in the climb or number two function selector position this error is integrated but under altitude control both the altitude error and the integrated error are fed to the servo amplifier control circuit. In this mode of operation constant altitude is maintained regardless of the pitch attitude.

In the number four function selector position, trim commands cause the integrator to run at a constant speed to put in trim up or trim down as selected. The craft then noses up or down at a constant rate.

In the number five or dive position, dive control calls for a constant rate of pitch over of the craft until the craft is in a downwardly inclined or even vertical attitude. At that time the pitch attitude gyro automatically transfers the integrator input from the constant speed signal for pitch over to integral control on the downwardly inclined or ninety degree pitch attitude position.

A radio command proportional pitch voltage signal of either phase can be applied at any time directly into the pitch servo amplifier control circuit giving a maximum attitude change roughly of about plus or minus seventeen degrees. This voltage originates within a radio command receiver and is applied across a resistor in the control circuit of the pitch servo amplifier.

The sequence of control applied to the aircraft by the apparatus involves a climb control at a predetermined attitude, constant altitude control, constant rate of pitch over, and stabilization in a downwardly inclined or at the ninety degree attitude of the craft. While a manually operable function selector has been shown which may provide the above sequences of flight, if desired, relays may be provided to introduce such series of sequences in flight.

Referring to the drawing in connection with the following detailed description of the apparatus, a servomotor 10 through its output member 11 positions attitude changing means of the aircraft such as the elevator surface 13 thereof which may be positioned manually independently of the servomotor. The servomotor operates in response to an electronic amplifier 12. The servomotor-amplifier combination is of the type well known in the art wherein the motor 10 may include a constantly rotating direct voltage energized motor which, through a differential arrangement, is operatively connected to the output member 11. The motor 10 would include "brake" windings to effect such connection and would further include a pair of "clutch" windings, each over riding a "brake" winding, which are alternatively energized to reversely control the direction of member 11. The clutch windings would be energized from the output of servomotor amplifier 12 which is of the alternating voltage discriminator type. The amplifier includes a control circuit for supplying a resultant alternating voltage of reversible phase to the amplifier. The amplifier 12 is further connected to an alternating voltage power supply and the amplifier includes a pair of relays one or the other of which is energized depending upon the phase relationship of the voltage from the signal circuit with respect to the phase of the voltage from the power supply. Closing of one relay closes contacts in a circuit that energizes one clutch winding and closing of the other relay energizes the other clutch winding. The amplifier-servomotor combination thus may be similar to that disclosed in Patent 2,425,733 to Willis H. Gille, et al. dated August 19, 1947.

The amplifier 12 comprises signal input terminals 14 and 15 and alternating voltage power input terminals 16 and 17. The output of the amplifier is transmitted by conductors 18 and 19 to servo 10. Additionally the servo 10 and amplifier 12 are connected in a parallel to a source of D.C. voltage such as a battery 20 through a single pole single throw switch 21 for supply of voltage for the "brake" windings and amplifier relay contact circuits.

Amplifier 12 having signal input terminals 14, 15 has applied to such terminals control signals from a balanceable network or control circuit 24. The various control signals in control circuit 24 are arranged in series summing relationship and the signals themselves may be alternating voltage signals. The individual signals provided in circuit 24 comprise a servomotor operated rebalance signal, a radio command proportional pitch signal, a pitch rate signal, an integrator motor operated signal, a pitch attitude signal, and an altitude signal. These signals are not at all times simultaneously supplied to circuit 24.

The rebalance or follow-up signal is provided by a signal generator 25 comprising a potentiometer 26 having a slider 27 and resistor 28. The resistor 28 is connected across a secondary winding 29 of a transformer 30 having a primary winding 31. A conductor 32 connects amplifier terminal 14 with slider 27, and the slider 27 may be operated in either direction from the electrical center of resistor 28, having a potential corresponding to a center tap of secondary winding 29, by a suitable follow-up connection 33 extending thereto from servo output member 11.

Signal generator 34 comprises a resistor 35 which is energized from a suitable radio means, not shown. A conductor 36 extends from a center tap of secondary winding 29 to one end of resistor 35.

Pitch rate signals are provided by a generator 37 comprising a potentiometer 38 having an adjustable slider 39 and resistor 40. Resistor 40 is connected across a secondary winding 41 of transformer 30. Since a single primary winding may energize a plurality of secondary windings, transformer 30 is indicated as having such plurality of secondary windings. Slider 39 may be positioned in either direction from the electrical center of resistor 40 having potential corresponding to that of a center tap of secondary winding 41. Slider 39 is so positioned by an angular rate gyroscope 43 arranged to respond to craft pitch attitude rates. The gyroscope is of the type well known in the art and comprises a rotor having a spin axis and a precession axis with the precession being restrained for example by suitable spring means. A conductor 44 extends between the opposite end of the resistor 35 and slider 39.

Integration signals are provided by a potentiometer 48 having an adjustable slider 49 and a resistor 50 connected across a secondary winding 53 of transformer 30. Slider 49 may be positioned in either direction from the electrical center of resistor 50 by a pitch integrator 45 to be described. A conductor 46 extends from a center tap of secondary winding 41 to slider 49.

Pitch attitude signals are supplied by a pitch attitude potentiometer comprising a slider 57 and resistor 58. Resistor 58 is connected across secondary winding 53, and slider 57 may be displaced in either direction from the electrical center of resistor 58 by a vertical gyroscope 59 responsive to the pitch attitude of the aircraft. Gyroscope 59 is of the type well known in the art having a rotor with its spin axis in a vertical direction and gimballed about two respectively perpendicular horizontal axes.

Altitude signals are derived from an altitude sensor synchro 61 having its output voltage signal applied across a resistor 67. Synchro 61 is positioned through an electromagnetic clutch 62 from an altitude sensing device 63. The clutch 62 includes an operating winding 64 which is connected through a manually operable switch 65 to a direct voltage source such as battery 66. The altitude sensor may be similar to that disclosed in Patent 2,512,902 to Rossire wherein in Figure 2, synchro 61 herein corresponds with synchro winding 50 of the patent. The clutch 62 herein corresponds generally with the magnetic clutch 44 of the patent. The output of synchro 61 applied across resistor 67 is transmitted by conductors 79 and 80 in series to slider 57. The opposite end of resistor 67 is connected by conductor 81 to signal ground and the amplifier control circuit is completed through amplifier ground conductor 82 to amplifier terminal 15.

Reverting to the integrator 45, its components comprising an integrator amplifier 90 and an integrator motor 91. The integrator amplifier may be of a conventional type comprising a combined alternating voltage amplifier and discriminator section. The integrator motor 91 likewise may be of a conventional type comprising a capacitor type induction motor which is reversibly controlled from the amplifier 90 and in turn includes within its housing and drives a velocity signal generator (not shown in detail) which has its output fed back to the integrator amplifier 90. The velocity signal generator includes a voltage divider across its output member having a slider which may be adjusted to vary the time constant of the integrator. Since these features are not novel herein but are well known in the art the details have been omitted. The amplifier-motor-velocity signal generator may be of the type shown in U.S. Patent 2,664,530 to Young.

The integrator amplifier 90 receives alternating signal voltages of various combinations depending upon the configuration selected. It may be controlled by a servo amplifier pitch attitude cancelling circuit, a nine degree pitch up attitude signal circuit, a ninety degree down circuit, a craft pitch over or dive circuit, or alternatively a trim up or trim down at a constant rate circuit. The pitch attitude cancelling signal circuit is obtained between slider 49 and slider 57 of the integrator potentiometer and the pitch attitude potentiometer respectively. A conductor 93 connects slider 49 with a function selector number 1 position contact of a function selector 84. Slider 57 is connected by conductor 80, series connected resistors 69, 68 to ground, to complete the control circuit for integrator amplifier 90.

The nine degree climb attitude signal is obtained from network 47. The network 47 additionally to potentiometer 48 comprises two resistors 51 and 52 connected in series and thence in parallel with resistor 50 across transformer secondary winding 53. Resistors 51 and 52 are of different values so that their junction represents the desired pitch attitude in climb. The junction of terminals 51 and 52 is connected by conductor 94 to a number 2 position or selected climb attitude contact of function selector 84. The control signal applied to the number 2 contact is the voltage between the junction of resistors 51, 52 and pitch attitude potentiometer slider 57.

The output of the altitude sensor synchro 61 is also applied across resistors 69, 68 in series and their junction 70 is connected by a conductor 95 to a number 3 position or altitude control contact of function selector 84. The control signal on amplifier 90 from the number three contact is the voltage between junction 70 and ground derived from the altitude sensor operated synchro 61.

The function selector 84 comprises two number 4 contacts one an up contact and the other a down contact. Fixed voltage signals are applied to the two number 4 contacts from a transformer 71 having a primary winding 72 and secondary winding 73. The secondary winding 73 includes a grounded center tap and has points intermediate the center tap and ends of winding 73 and equally electrically displaced therefrom but on opposite sides of the center tap connected in series by a resistor 74, resistor 75 and resistor 76. Resistors 74 and 76 are equal but resistor 75 is greater than either resistor 74 and 76. The junction 77 of resistors 74 and 75 is connected by conductor 98 to the number 4 position down contact whereas junction 78 of resistors 76, 75 is connected by conductor 99 to the function selector 4 position up contact.

The secondary winding 73 additionally has extending from one end thereof a conductor 100 extending to a number five function selector position contact to provide a signal greater in magnitude than that applied to the number 4 down contact. The circuit from secondary winding 73 to the number five contact in addition to conductor 100 includes a single pole double switch having an operable arm 102 and engageable spaced contacts 103, 104. The arrangement is such that when the arm 102 engages contact 103, function selector contact 5 is connected with conductor 100. When switch arm 102 engages contact 104, switch arm 102 is connected through contact 104 and a conductor 111 to the junction of resistors 54, 55 which provides a signal commanding a downward inclination of the craft and may be a 90 degree down pitch attitude. The function selector includes an adjustable contactor 85 engageable with the selector contacts 1, 2, 3, 4, and 5. Conductor 86 connects contactor 85 with the pitch integrator amplifier 90. The operable switch arm 102 is operated from the vertical gyroscope 59 when the craft pitch attitude attains a predetermined pitch down attitude such as a vertical down attitude relative to the earth by suitable motion transmission means 105.

Operation

The operational cycle of the craft would involve as stated: initially a climb attitude of about nine degrees, a constant altitude flight, a constant rate of nose over to desired downward inclination or even a perpendicular to the earth, followed by stabilization at this downward inclination or perpendicular. These flight operations are done in sequence as noted. Prior to beginning the flight operation, the function selector 84 is adjusted with the contactor 85 engaging the number 1 contact. The elevator may be manually positioned to trim the craft. In this function selector position, the potential between slider 49 and pitch attitude slider 57 is applied to the pitch control channel integrator amplifier 90 causing the pitch integrator motor 91 to drive slider 49 to null the input on amplifier 90. The altitude selector switch 65 is in unoperated position and the vertical dive switch 101 has its operable arm engaging contact 103. The input circuit 24 of the servomotor amplifier 10 is in a balanced condition. Thereafter switch 21 is closed to operatively engage the automatic control apparatus and attitude changing means.

Contactor 85 is moved to the number two position, and the signal on integrator amplifier 90 is the voltage between the junction of resistors 51, 52 and the pitch attitude potentiometer slider 57. The integrator motor 91 integrates with respect to time the error between the nine degree pitch attitude called for at the resistors junction and the attitude measured by the pitch gyro and which is reflected in the operation of slider 57. With the motor rate or velocity signal feedback provided in integrator 45, the motor rate is proportional to the error between the nine degree pitch attitude called for and the actual craft pitch attitude measured by the pitch gyro. The integrated error signal reflected by the displacement of slider 49 is fed into the control circuit 24 of the servo amplifier 12. Amplifier 12 causes the operation of servo 10 to position the pitch attitude changing device of the craft and simultaneously through the follow up drive 33 operates slider 27 of potentiometer 26 to rebalance circuit 24. By means of the integrated attitude error signal that is the integration of the difference between the selected attitude and the actual attitude, the craft will be caused to fly at the selected or nine degree up attitude.

After the craft has climbed to the desired altitude, the function selector arm 85 is adjusted to engage the number three contact and altitude control switch 65 is closed. The altitude sensor 63 senses changes from altitude attained when switch 65 was closed and through the energized magnetic clutch 62 adjusts the previously centered altitude sensor synchro 61 from center position in accordance with such altitude changes. This altitude error signal is applied across resistors 68, 69 in series and the signal applied to the integrator amplifier 90 is that at junction 70. This altitude error signal is integrated through the integrator 45. Additionally, the altitude error signal developed in altitude sensor synchro 61 is directly applied in series with the pitch attitude signal to control the servo amplifier 12 so that under the combined integrated altitude error signal and the altitude error signal, constant altitude is maintained regardless of the pitch attitude.

When the craft has flown a desired distance at constant altitude, the function selector may be placed in engagement with the number 5 or dive contact. This control calls for a constant rate of craft pitch over until the craft is at a predetermined downwardly inclined attitude such as in a down vertical attitude. The signal on the integrator amplifier 90 during the pitch over is that obtained from one end of transformer secondary winding 73. By means of the velocity feedback obtained from the velocity signal generator driven by the integrator motor 91, the motor rate is proportional to the signal from secondary winding 73.

The signal on the servo amplifier 12 is supplemented by that obtained from the pitch rate signal generator network 37, that obtained from the pitch attitude potentiometer and that obtained from the rebalance signal generator 25. If the pitch rate of the craft ordered by slider 49 does not cause the displacement of slider 57 by vertical gyroscope 59 to substantially equal the displacement of slider 49 from the integrator 45, the control signal on servo amplifier 12 increases causing an increase in the displacement of the pitch attitude changing device which increases the craft pitch rate until the rate of displacement of sliders 49 and 47 indicates the proper craft displacement rate.

When the craft has attained a predetermined downward inclination such as a ninety degree down pitch attitude, the pitch gyro operated, ninety degree switch arm 102 transfers the integrator input from the constant speed signal for pitch over to integral control on the predetermined attitude or ninety degree attitude. This predetermined down inclination or ninety degree attitude control signal is obtained from the junction of resistors 54, 55. This ninety degree attitude signal is opposed to the actual pitch attitude signal from the displacement of slider 57, and the difference of these two signals is applied to the integrator amplifier 90. The integrator 45 displaces slider 49 so that the craft maintains the ninety degree pitch down attitude.

Trim commands may be obtained by adjusting the function selector 84 to engage the number 4 down or the number 4 up contacts. Such trim command signals cause the integrator 45 to run at a constant speed to put in trim up or trim down as selected. The craft then noses up or down at a constant rate.

A voltage signal of either phase can be applied at any time directly into the control circuit 24 of amplifier 12 from a remote radio command signal by a voltage across resistor 35 giving a maximum attitude change of a fixed value.

The use of the integrator 45 has been described under the previous control system functional operation. For any mode of operation not previously described, the input of the integrator motor amplifier is grounded thereby causing the integrator motor to remain in its last operating position. The integrator motor amplifier drives the integrator motor at a rate and direction proportional to the input signal of amplitude and phase. The integrator acts as a smoothing filter, supplies trim and control signals and performs the reset functions for the altitude controller. The output of the velocity signal generator driven by the integrator motor with respect to speed may be selected or adjusted to secure the optimum rate of operation of the integrator motor.

It will now be apparent that there has been provided a novel control system wherein an integrator is utilized to introduce a command control into the system to initiate control at one condition; to utilize the integrator to act as a reset device for maintaining a different condition; and for utilizing this integrator to cause a rate of change of a third condition. While the control system has been applied to an aircraft and the functions performed are climb attitude, constant altitude and rate of attitude change in a nose over, the invention may be embodied in other control systems. Thus it is apparent that there are many changes which would be made in the above described construction without departing either in spirit or scope from the present invention. Therefore all matter contained in the foregoing description or shown in the accompanying drawing are considered as illustrative and not in a limiting sense.

What I claim is:

1. Apparatus for controlling the direction of flight of a dirigible craft, said apparatus comprising: means for providing a first signal varying in magnitude in response to changes in attitude of the craft; second means for providing an increasingly varying second attitude control signal; a servomotor means responsive to both said signals to control craft attitude; selective means for producing a fixed signal; further motor means controlled by said fixed signal and operating at a rate in accordance with the magnitude thereof; actuating means operating said second signal means from said motor means; a third signal of fixed magnitude; and additional means effective on change in craft attitude a predetermined amount from said first and second signals for controlling said further motor means from said first and third signals for stabilizing craft attitude at the predetermined attitude.

2. Apparatus for controlling the pitch attitude of a dirigible craft, said apparatus comprising: servo means controlling the attitude of the craft; means providing a first signal varying in magnitude at a selected rate; means providing a craft attitude signal, both signals controlling said servo means; and attitude responsive means operated when said craft reaches a predetermined attitude for disabling said first signal from controlling said servo means and stabilizing craft pitch attitude at the predetermined attitude.

3. Apparatus for controlling a condition, said apparatus comprising: servo means operating condition changing means; means providing a first signal voltage varying in magnitude at a selected rate and a second signal voltage responsive to the change in said condition, both signal voltages being in opposing relation and controlling said servo means whereby the condition is altered at a selected rate; and further condition responsive means operated when said condition reaches a predetermined magnitude for terminating the selected rate variation of said first signal voltage and stabilizing the condition at the predetermined magnitude.

4. Apparatus for controlling the direction of flight of an aircraft, said apparatus comprising: a voltage responsive servo means for controlling the direction or attitude of said dirigible craft; means for producing a voltage varying in response to change of attitude of said craft; means for producing an attitude control voltage; circuit means combining said voltages and connected to said servo means; means for varying the attitude control voltage at a selected rate; a third source of fixed voltage; and further means effective on change in craft attitude a predetermined amount from said first and second voltages for controlling said attitude control voltage from said first and third voltages.

5. Apparatus for controlling the pitch attitude of a dirigible craft, said apparatus comprising: a first voltage responsive servo means for varying the pitch attitude of said craft; attitude responsive means for producing a first voltage varying in accordance with the pitch of said craft; second servo means for producing a pitch attitude control second voltage; means for combining said attitude responsive voltage and said pitch attitude control voltage and controlling said first servo means; means for controlling said second servo means at a selected rate; means supplying a fixed third voltage; a member responsive to pitch attitude of the craft; and further means responsive to said member on change in attitude a predetermined amount from said pitch attitude control voltage and said attitude responsive voltage for controlling said second servo means from said first and third voltages and disabling control of said second servo means at a selected rate.

6. Attitude control apparatus for an aircraft having a control surface comprising: a servomotor operating said control surface; craft attitude responsive means for developing a first voltage in accordance with change in attitude; follow-up voltage means responsive to said servo motor for providing a second voltage proportional to displacement of said motor; means controlling said servomotor from both said voltages; motor means for generating a third voltage to control said servomotor; an altitude signal voltage generator; and means controlling said second motor means and responsive to said attitude and third signal voltages or said altitude voltage for stabilizing the attitude or altitude of the craft.

7. Flight condition control apparatus for an aircraft having a control surface, said apparatus comprising servomotor means for moving said control surface; means for generating a first control signal in response to change in attitude of said aircraft from a desired attitude; means for generating a second signal in accordance with the displacement of said servomotor from a null position; means for combining said first and second signals in opposing relation to control said servomotor; means for providing a third signal; a second motor means for actuating said third signal generating means and selectively responsive to non-transient differences between said first and third signals to nullify said non-transient differences; means responsive to the altitude of the craft for generating a fourth signal; and means for alternatively controlling said second motor means from said fourth signal to cause the craft to fly at a selected altitude.

8. Apparatus for selectively controlling the pitch attitude of a craft in accordance with a fixed magnitude signal and selectively permitting altitude control of the craft, said apparatus comprising: first means for providing a pitch attitude control voltage; second pitch attitude responsive means providing a voltage in accordance with actual pitch attitude of the craft; motor operated means connected to said first and second means and providing a third voltage for varying craft pitch attitude in accordance with variations between said first and second voltages; altitude responsive means producing a fourth voltage; and further means disabling said pitch attitude responsive means from control of the motor operated means and controlling the motor operated means from said fourth voltage thereby varying said third voltage in accordance with the time integral of said fourth voltage for maintaining a desired altitude.

9. Apparatus for controlling the flight attitude of a dirigible craft, said apparatus comprising: voltage responsive servo means for controlling the attitude of said craft, first attitude responsive signal means for producing a voltage varying with change of attitude of said craft; second means producing an attitude control voltage component; circuit means for applying to said servo means a control voltage varying as the relative values of said first and second voltage components; means for varying said second control voltage at a selected rate to cause change in craft attitude at a selected rate; means effective on attaining a desired attitude of the craft for terminating adjustment of said second voltage at a desired rate and controlling adjustment thereof in accordance with the first signal and a signal representative of the desired attitude of the craft.

10. Apparatus for controlling the flight attitude of an aircraft having attitude changing means, said apparatus comprising: voltage responsive servo means operating said attitude changing means; first means producing a voltage signal varying in response to change of attitude of the craft; second means producing an attitude control voltage signal; voltage combining circuit means applying to said servo means a control voltage varying as the relative values of said voltage signals; motor operated means varying said attitude control voltage signal at a fixed rate to cause change in attitude of the craft at a fixed rate; attitude responsive means effective when the craft has attained a desired attitude to terminate operation of said motor operated means at a fixed rate; means for supplying a signal representative of the desired attitude of the craft, and means for additionally controlling said motor operated means from said attitude change voltage signal and said desired attitude signal.

11. Flight control apparatus for controlling the pitch attitude of the dirigible craft, said apparatus comprising: servo means for varying the pitch attitude of said craft; first responsive means producing a voltage in accordance with actual pitch attitude of said craft; second means producing a pitch attitude control voltage; control means combining said attitude responsive voltage and said pitch attitude control voltage and applying the resultant to said servo means; altitude responsive means sensing changes in altitude; means responsive to the altitude responsive means varying said pitch attitude control voltage whereby said attitude control voltage is a time integral of said altitude change; and means disabling said altitude responsive means from adjusting said attitude control voltage and varying said attitude control voltage in accordance with the actual pitch attitude voltage and the pitch attitude control voltage to thus eliminate non-transient differences between said attitude control voltage and said actual pitch attitude voltage.

12. Apparatus for selectively controlling the attitude of an aircraft comprising: an attitude responsive device for providing a first voltage signal varying with craft attitude; a second signal providing means producing a variable voltage signal; a first motor means adjusting the second signal providing means in accordance with the difference of said two voltages; a third signal providing means providing a fixed magnitude, attitude control voltage; means disabling said variable signal from control of said first motor means and controlling said motor means from said fixed magnitude, attitude control voltage and first voltage signal; a second servomotor means controlling craft attitude; and means controlling said second servomotor means from said first voltage signal and said variable signal said second servomotor means control while said variable signal is so disabled from control of the first motor means, effects gradual changes in attitude from said fixed magnitude attitude control voltage through said first motor means to prevent sudden change in craft attitude.

13. A navigation control apparatus for a dirigible craft, servo means controlling the attitude of the craft; variable rate motor means; further means operating said motor means at a predetermined rate; attitude sensing means responsive to the change of attitude of the craft; additional means controlled by both said motor means and attitude responsive means and operating said servo means to alter craft attitude; and switching means operated by said attitude responsive means when the craft attains a predetermined attitude thereby terminating operation of said motor means from said further means.

References Cited in the file of this patent

UNITED STATES PATENTS

| | | |
|---|---|---|
| 2,443,748 | Sanders et al. | June 22, 1948 |
| 2,552,196 | MacCullum et al. | May 8, 1951 |
| 2,764,370 | Yates | Sept. 25, 1956 |